United States Patent
Eoff et al.

(10) Patent No.: US 7,063,153 B2
(45) Date of Patent: Jun. 20, 2006

(54) METHODS AND COMPOSITIONS FOR CEMENTING WELLS

(76) Inventors: Larry S. Eoff, 2201 Cedar, Duncan, OK (US) 73533; Krista L. Keener, 504 N. 20th, Duncan, OK (US) 73533

( * ) Notice: Subject to any disclaimer, the term of this patent is extended or adjusted under 35 U.S.C. 154(b) by 101 days.

(21) Appl. No.: 10/773,632

(22) Filed: Feb. 6, 2004

(65) Prior Publication Data

US 2004/0159431 A1    Aug. 19, 2004

Related U.S. Application Data

(63) Continuation-in-part of application No. 10/176,344, filed on Jun. 20, 2002, now Pat. No. 6,715,552.

(51) Int. Cl.
*E21B 33/13* (2006.01)

(52) U.S. Cl. ............... 166/293; 166/295; 523/130; 106/808

(58) Field of Classification Search ........... 166/293, 166/295; 523/130; 106/808
See application file for complete search history.

(56) References Cited

U.S. PATENT DOCUMENTS

| | | | |
|---|---|---|---|
| 4,011,909 A | 3/1977 | Adams et al. ............ 166/293 |
| RE31,190 E | 3/1983 | Detroit et al. ............ 166/293 |
| 4,515,635 A | 5/1985 | Rao et al. .............. 106/90 |
| 4,555,269 A | 11/1985 | Rao et al. .............. 106/90 |
| 4,557,763 A | 12/1985 | George et al. ........... 106/90 |
| 4,640,942 A | 2/1987 | Brothers ................ 523/130 |
| 4,674,574 A | 6/1987 | Savoly et al. ........... 166/293 |
| 4,676,317 A | 6/1987 | Fry et al. .............. 166/293 |
| 4,687,516 A | 8/1987 | Burkhalter et al. ........ 106/90 |
| 4,837,271 A | 6/1989 | Brindopke ............. 525/330.3 |
| 4,938,803 A | 7/1990 | Huddleston et al. ....... 106/719 |
| 4,941,536 A | 7/1990 | Brothers et al. ......... 166/293 |
| 4,997,487 A | 3/1991 | Vinson et al. ........... 106/804 |
| 5,028,271 A | 7/1991 | Huddleston et al. ....... 106/720 |
| 5,039,433 A | 8/1991 | Sopko et al. ............ 252/8.551 |
| 5,049,288 A | 9/1991 | Brothers et al. ......... 252/8.551 |
| 5,076,852 A | 12/1991 | Bloys et al. ............ 106/725 |
| 5,134,215 A | 7/1992 | Huddleston et al. ....... 527/400 |
| 5,147,964 A | 9/1992 | Huddleston et al. ....... 527/400 |
| 5,149,370 A | 9/1992 | Olaussen et al. ......... 106/737 |
| 5,151,131 A | 9/1992 | Burkhalter et al. ....... 106/822 |
| 5,184,680 A | 2/1993 | Totten et al. ........... 166/293 |
| 5,263,542 A | 11/1993 | Brothers ................ 166/293 |
| 5,340,397 A | 8/1994 | Brothers ................ 106/727 |
| 5,346,550 A | 9/1994 | Kunzi et al. ............ 106/709 |
| 5,355,955 A | 10/1994 | Rodrigues et al. ........ 166/293 |
| 5,368,642 A | 11/1994 | Rodrigues et al. ........ 106/727 |
| 5,389,706 A | 2/1995 | Heathman et al. ......... 524/5 |
| 5,398,759 A | 3/1995 | Rodrigues et al. ........ 166/293 |
| 5,421,881 A | 6/1995 | Rodrigues et al. ........ 106/809 |
| 5,447,198 A | 9/1995 | Kunzi et al. ............ 166/293 |
| 5,536,311 A | 7/1996 | Rodrigues ............... 106/724 |
| 5,836,392 A | 11/1998 | Urlin-Smith ............. 166/295 |
| 5,866,517 A | 2/1999 | Carpenter et al. ........ 507/226 |
| 6,136,935 A * | 10/2000 | Udarbe et al. ........... 526/312 |
| 6,187,887 B1 | 2/2001 | Albrecht et al. ......... 526/264 |
| 6,192,986 B1 | 2/2001 | Urlwin-Smith ........... 166/295 |
| 6,196,317 B1 | 3/2001 | Hardy .................. 166/295 |
| 6,465,587 B1 | 10/2002 | Bair et al. ............. 526/240 |
| 6,497,283 B1 | 12/2002 | Eoff et al. ............. 166/293 |
| 6,573,316 B1 | 6/2003 | Albrecht et al. ......... 524/96 |
| 6,590,050 B1 | 7/2003 | Bair et al. ............. 526/240 |
| 6,608,159 B1 | 8/2003 | Fenchl et al. ........... 526/288 |
| 6,739,806 B1 | 5/2004 | Szymanski et al. ........ 405/267 |
| 6,767,867 B1 | 7/2004 | Chatterji et al. ........ 507/216 |
| 2003/0008779 A1 | 1/2003 | Chen et al. ............. 507/200 |

FOREIGN PATENT DOCUMENTS

| | | |
|---|---|---|
| EP | 1 375 818 A1 | 1/2004 |
| GB | 2 210 888 A | 6/1989 |
| WO | WO 99/26991 | 6/1999 |
| WO | WO 03/085013 A2 | 10/2003 |
| WO | WO 03/97721 | 11/2003 |

OTHER PUBLICATIONS

PTO-04-4736 translation of WO 03/085013 A2, translated Aug. 2004 by Ralph McElroy Translation Company, 25 pages.*
Foreign communication from a related counterpart application dated May 3, 2005.

* cited by examiner

*Primary Examiner*—Katherine Mitchell
(74) *Attorney, Agent, or Firm*—Craig W. Roddy; McAfee & Taft

(57) ABSTRACT

Methods of cementing subterranean zones penetrated by well bores and well cement compositions. A well cement composition of the invention basically comprises a hydraulic cement, water in an amount sufficient to form a pumpable slurry and a fluid loss control polymer additive comprising 77.9 weight % of the calcium salt of 2-acrylamido-2-methyl propane sulfonic acid, 8 weight % of the calcium salt of maleic acid, 11 weight % of N-vinyl caprolactam, 3 weight % of 4-hydroxybutyl vinyl ether and 0.1 weight % of methylene bisacrylamide.

12 Claims, No Drawings

METHODS AND COMPOSITIONS FOR CEMENTING WELLS

CROSS-REFERENCE TO RELATED APPLICATION

This application is a Continuation-In-Part of U.S. patent application Ser. No. 10/176,344 filed on Jun. 20, 2002 now U.S. Pat. No. 6,715,552, the entire disclosure of which is incorporated herein by reference.

BACKGROUND OF THE INVENTION

1. Field of the Invention

The present invention relates to well cementing methods and compositions.

2. Description of the Prior Art

Hydraulic cement compositions are commonly utilized in the construction and repair of oil and gas wells. For example, hydraulic cement compositions are used in primary cementing operations whereby strings of pipe such as casing or liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented. Hydraulic cement compositions are also commonly used to plug lost circulation and other undesirable fluid inflow and outflow zones in wells, to plug cracks or holes in pipe strings cemented therein and to accomplish other required remedial well operations.

In order for such well cementing operations to be successful, the cement compositions utilized must include a fluid loss control additive to reduce the loss of fluid, i.e., water, from the cement compositions when they contact permeable subterranean formations or zones. Excessive fluid loss causes a cement composition to be prematurely dehydrated which limits the amount of cement composition that can be pumped, decreases the compressive strength of the cement composition and prevents or reduces bond strength between the set cement composition and a subterranean zone, the walls of pipe and/or the walls of the well bore.

Heretofore polymers and copolymers have been utilized as fluid loss control additives for well cements. A particularly suitable copolymer which has been utilized as a cement composition fluid loss control additive is a copolymer of 2-acrylamido-2-methyl propane sulfonic acid and N,N-dimethylacrylamide having mole ratios of 2-acrylamido-2-methyl propane sulfonic acid to N,N-dimethylacrylamide of between 1:4 and 4:1 respectively, and having an average molecular weight of between about 75,000 and 3,000,000. While the above described copolymer well cement fluid loss control additive has achieved commercial success, there is a continuing need for improved polymer fluid loss control additives which achieve better fluid loss control in well cement compositions particularly at high temperatures.

SUMMARY OF THE INVENTION

The present invention provides well cementing methods and compositions which include improved fluid loss control additives that reduce the loss of water from cement compositions including at high temperatures, e.g. 230° F. The fluid loss control additives comprise water soluble polymers that meet the need described above and overcome the deficiencies of the prior art. The water soluble fluid loss control polymer additives which are useful in accordance with this invention comprise the following monomers:

a) 5 to 93 weight % of monomers of the formula (Ia) or (Ib) or both

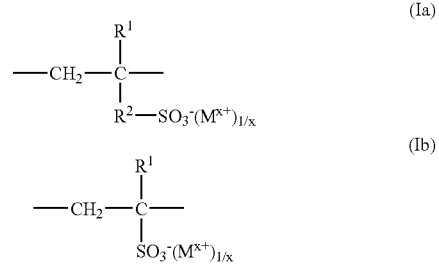

wherein
R¹ is hydrogen or $C_1$–$C_5$ alkyl,
$R^2$ is $C_1$–$C_{20}$ alkylene, carboxy $C_1$–$C_{20}$ alkylene, carboamido $C_1$–$C_{20}$ alkylene or phenylene,
M is hydrogen, ammonium or a metal cation in the oxidation state +I, +II or +III and
x is 1 to 3;

b) 1 to 50 weight % of monomers of the formula (IIa) or (IIb) or both

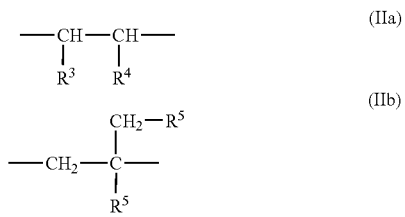

wherein
$R^3$ and $R^4$ are —COO⁻$(M^{x+})_{1/x}$ or

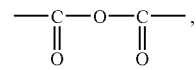

$R^5$ is —COO⁻$(M^{x+})_{1/x}$,
M is hydrogen, ammonium or a metal cation in the oxidation state +I, +III or +III and
x is 1 to 3;

c) 5 to 93 weight % of a monomer of the formula (III)

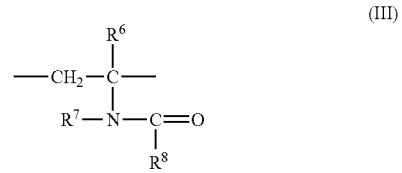

wherein
$R^6$ is hydrogen or $C_1$-$C_5$ alkyl,
$R^7$ is hydrogen, $C_1$–$C_{10}$ alkyl or —$(CH_2)_y$—,
$R^8$ is hydrogen, $C_1$–$C_{10}$ alkyl or —$(CH_2)_y$—, and
y is 3 to 7; and
d) 1 to 25 weight % of monomers of the formulas (IVc) or (IVa) and (IVc) or (IVb) and (IVc) or (IVa), (IVb) and (IVc).

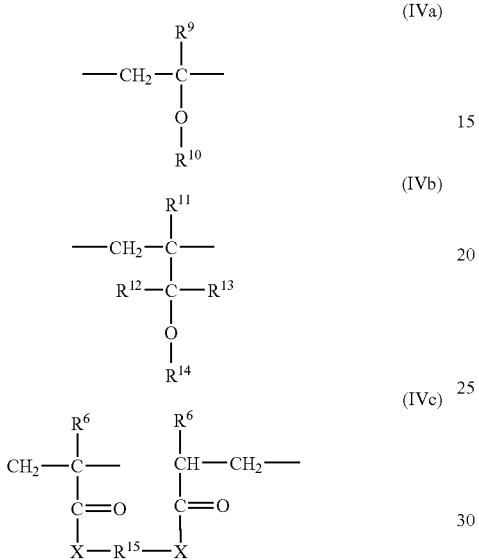

wherein
$R^6$ is hydrogen or $C_1$–$C_5$ alkyl,
$R^9$ is hydrogen or $C_1$–$C_5$ alkyl,
$R^{10}$ is $C_1$–$C_{10}$ alkyl, $C_1$–$C_{10}$ aminoalkyl, $C_1$–$C_{20}$ hydroxyalkyl, $C_1$–$C_4$ alkyl or hydroxyl terminated mono- or poly-$C_2$–$C_3$ alkylenoxy (with 1 to 400 alkylenoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl,
$R^{11}$, $R^{12}$ and $R^{13}$ are hydrogen or $C_1$–$C_5$ alkyl,
$R^{14}$ is hydrogen, $C_1$–$C_{20}$ alkyl, $C_1$–$C_{10}$ aminoalkyl, $C_1$–$C_{20}$ hydroxyalkyl, $C_1$–$C_4$ alkyl or hydroxyl terminated mono- or poly-$C_2$–$C_3$ alkylenoxy (with 1 to 400 alkylenoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl or with hydroxyl substituted $C_1$–$C_{20}$ alkylensulfonic acids and their ammonium, alkali metal or alkaline earth metal salts,
$R^{15}$ is

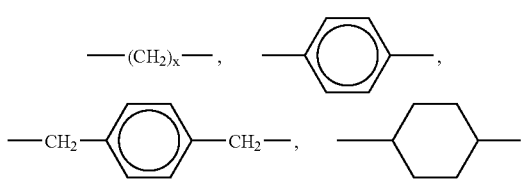

X is O, NH, and
x is 1 to 6
wherein the monomers add up to 100 weight %.

The methods of this invention for cementing a subterranean zone penetrated by a well bore basically comprise the following steps. A cement composition is prepared or provided comprising a hydraulic cement, sufficient water to form a pumpable slurry and a fluid loss control polymer additive as described above. The composition is placed into the subterranean zone to be cemented and then allowed to set into an impermeable solid mass therein.

The cement compositions of this invention basically comprise a hydraulic cement, sufficient water to form a pumpable slurry and a fluid loss control polymer additive as described above.

A preferred fluid loss control polymer additive useful in this invention is a polymer containing the calcium salt of 2-acrylamido-2-methyl propane sulfonic acid in an amount of about 77.9 weight %, the calcium salt of maleic acid in an amount of about 8 weight %, N-vinyl caprolactam in an amount of about 11 weight %, 4-hydroxybutyl vinyl ether in an amount of about 3 weight % and methylene bisacrylamide in an amount of about 0.1%. The polymer additive has a molecular weight of about 250,000.

The objects, features and advantages of the present invention will be readily apparent to those skilled in the art upon a reading of the description of preferred embodiments which follows.

DESCRIPTION OF PREFERRED EMBODIMENTS

The methods of the present invention for cementing a subterranean zone penetrated by a well bore at temperatures up to and including 230° F. and higher basically comprise the following steps. A cement composition is prepared or provided comprising a hydraulic cement, sufficient water to form a pumpable slurry and a fluid loss control polymer additive. The cement composition is placed in the zone to be cemented and thereafter the cement composition is allowed to set into an impermeable solid mass therein. The placement of the cement composition is usually accomplished by pumping the cement composition through the well bore and into the zone to be cemented.

The cement compositions of this invention basically comprise hydraulic cement, sufficient water to form a pumpable slurry and a fluid loss control polymer additive.

A variety of hydraulic cements can be utilized in accordance with the present invention including, but not limited to, Portland cements, pozzolana cements, gypsum cements, aluminous cements and silica cements. Portland cements are generally preferred with the types defined and described in *API Specification For Materials And Testing For Well Cements*, API Specification 10B, 22$^{nd}$ Edition, dated December, 1997 of the American Petroleum Institute being particularly suitable. Preferred such API Portland cements include classes A, B, C, G and H with API classes G and H being more preferred.

The water in the cement compositions can be fresh water or salt water. The term "salt water" includes unsaturated salt solutions and saturated salt solutions including brines and seawater. Generally, any water can be utilized so long as it does not adversely affect components of the well cement composition. The water is generally present in a cement composition of this invention in an amount sufficient to form a pumpable slurry, i.e., in an amount in the range of from about 30% to about 120% by weight of cement in the composition. The water is generally present in the cement composition in an amount in the range of from about 35% to about 100% by weight of hydraulic cement therein.

As mentioned above, the polymeric fluid loss control additives useful in accordance with this invention are water soluble polymers containing four different monomers, the principal monomer being an olefinic sulfonic acid.

More specifically, the fluid loss control polymers contain:
a) 5 to 93 weight % of monomers of the formula (Ia) or (Ib) or both

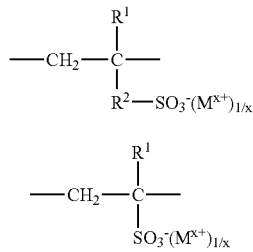

(Ia)

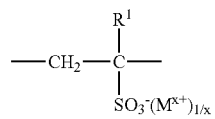

(Ib)

wherein
$R^1$ is hydrogen or $C_1$–$C_5$ alkyl,
$R^2$ is $C_1$–$C_{20}$ alkylene, carboxy $C_1$–$C_{20}$ alkylene, carboamido $C_1$–$C_{20}$ alkylene or phenylene,
M is hydrogen, ammonium or a metal cation in the oxidation state +I, +II or +III and
x is 1 to 3;
b) 1 to 50 weight % of monomers of the formula (IIa) or (IIb) or both

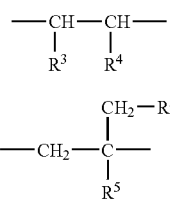

(IIa)

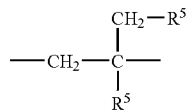

(IIb)

wherein
$R^3$ and $R^4$ are —COO$^-$(M$^{x+}$)$_{1/x}$ or

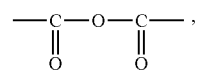

, $R^5$ is —COO$^-$(M$^{x+}$)$_{1/x}$,
M is hydrogen, ammonium or a metal cation in the oxidation state +I, +II or +III and
x is 1 to 3;
c) 5 to 93 weight % of a monomer of the formula (III)

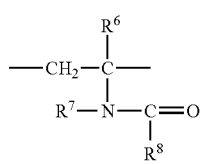

(III)

wherein
$R^6$ is hydrogen or $C_1$–$C_5$ alkyl,
$R^7$ and $R^8$ are hydrogen, $C_1$–$C_{10}$ alkyl or —(CH$_2$)$_y$—, and
y is 3 to 7; and d) 1 to 25 weight % of monomers of the formulas (IVc) or (IVa) and (IVc) or (IVb) and (IVc) or (IVa), (IVb) and (IVc).

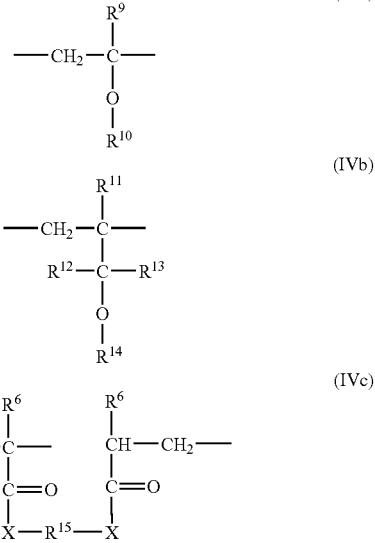

(IVa)

(IVb)

(IVc)

wherein
$R^6$ is hydrogen or $C_1$–$C_5$ alkyl,
$R^9$ is hydrogen or $C_1$–$C_5$ alkyl,
$R^{10}$ is $C_1$–$C_{10}$ alkyl, $C_1$–$C_{10}$ aminoalkyl, $C_1$–$C_{20}$ hydroxyalkyl, $C_1$–$C_4$ alkyl or hydroxyl terminated mono- or poly-$C_2$–$C_3$ alkylenoxy (with 1 to 400 alkylenoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl,
$R^{11}$, $R^{12}$ and $R^{13}$ are hydrogen or $C_1$–$C_5$ alkyl,
$R^{14}$ is hydrogen, $C_1$–$C_{20}$ alkyl, $C_1$–$C_{10}$ aminoalkyl, $C_1$–$C_{20}$ hydroxyalkyl, $C_1$–$C_4$ alkyl or hydroxyl terminated mono- or poly-$C_2$–$C_3$ alkylenoxy (with 1 to 400 alkylenoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl or with hydroxyl substituted $C_1$–$C_{20}$ alkylensulfonic acids and their ammonium, alkali metal or alkaline earth metal salts,
$R^{15}$ is

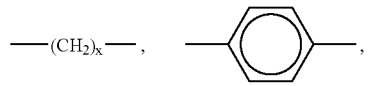

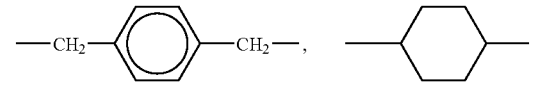

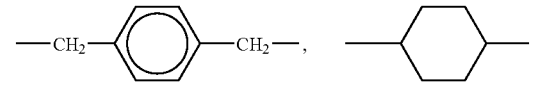

X is O, NH, and
x is 1 to 6 wherein the monomers add up to 100 weight %.
$R^1$ and $R^2$ of the monomers of the formulas (Ia) and (Ib) of the fluid loss control polymers of this invention are preferably hydrogen and —CO—NH—C(CH$_3$)$_2$—CH—, respectively, and M in the monomers of the formulas (Ia), (Ib), (IIa) and (IIb) are preferably metal cations wherein the +I metal cations are alkali metal ions, most preferably sodium or potassium ions, the +II metal cations are alkaline earth metal ions, most preferably calcium or magnesium ions and the +III metal cations are aluminum or iron ions.

In the monomer of the formula (III) y is preferably 3 to 5, and in the monomer of the formula (IV), $R^9$ is preferably hydrogen, $R^{10}$ is preferably —$CH_2$—, X is preferably —NH—, and x is preferably 1.

The fluid loss control polymers preferably contain 40 to 83 weight % of the monomers of the formulas (Ia), (Ib) or both, 5 to 48 weight % of the monomers of the formulas (IIa), (IIb) or both, 10 to 53 weight % of the monomer of the formula (III) and 1 to 10 weight % of the monomer of the formula IV.

A fluid loss control polymer of this invention preferably has a molecular weight in the range of from 10,000 to 3,000,000 grams per mole, more preferably in the range of from 100,000 to 1,000,000 grams per mole.

A preferred fluid loss control polymer of this invention comprises of 77.9 weight % of the calcium salt of 2-acrylamido-2-methyl propane sulfonic acid (I), 8 weight % of the calcium salt of maleic acid (II), 11 weight % of N-vinyl caprolactam (III), 3 weight % of 4-hydroxybutyl vinyl ether (IV) and 0.1 weight % of methylene bisacrylamide (IV).

The fluid loss control polymer additives of this invention can be prepared using known polymerization techniques.

A fluid loss control polymer additive as described above is included in a cement composition of this invention in an amount in the range of from about 0.1% to about 2% by weight of cement in the composition. As mentioned above, the fluid loss control polymers of this invention function to prevent fluid loss at temperatures up to and including 230° F. and higher.

As will be understood by those skilled in the art, a variety of other well cement composition additives known to those skilled in the art can be included in the cement compositions of this invention. Such additives include, but are not limited to, set retarding additives, set accelerating additives, dispersing agents, lightweight additives and the like.

A preferred method of cementing a subterranean zone penetrated by a well bore of this invention comprises the steps of: (a) preparing or providing a cement composition comprising a hydraulic cement, sufficient water to form a pumpable slurry and a fluid loss control polymer additive comprising 77.9 weight % of the calcium salt of 2-acrylamido-2-methyl propane sulfonic acid, 8 weight % of the calcium salt of maleic acid, 11 weight % of N-vinyl caprolactam, 3 weight % of 4-hydroxybutyl vinyl ether and 0.1 weight % of methylene bisacrylamide; (b) placing the composition in the zone to be cemented; and (c) allowing the cement composition to set into an impermeable solid mass therein.

A more preferred method of cementing a subterranean zone penetrated by a well bore comprises the steps of: (a) preparing or providing a cement composition comprising Portland cement, sufficient water to form a pumpable slurry and a fluid loss control polymer additive comprising 77.9 weight % of the calcium salt of 2-acrylamido-2-methyl propane sulfonic acid, 8 weight % of the calcium salt of maleic acid, 11 weight % of N-vinyl caprolactam, 3 weight % of 4-hydroxybutyl vinyl ether and 0.1 weight % of methylene bisacrylamide present in the cement composition in an amount in the range of from about 0.1% to about 2% by weight of hydraulic cement therein; (b) placing the composition in the zone to be cemented; and (c) allowing the cement composition to set into an impermeable solid mass therein.

A preferred well cement composition of this invention comprises a hydraulic cement, sufficient water to form a pumpable slurry and a fluid loss control polymer additive comprising 77.9 weight % of the calcium salt of 2-acrylamido-2-methyl propane sulfonic acid, 8 weight % of the calcium salt of maleic acid, 11 weight % of N-vinyl caprolactam, 3 weight % of 4-hydroxybutyl vinyl ether and 0.1 weight % of methylene bisacrylamide.

A more preferred well cement composition comprises Portland cement, sufficient water to form a pumpable slurry and a fluid loss control polymer additive comprising 77.9 weight % of the calcium salt of 2-acrylamido-2-methyl propane sulfonic acid, 8 weight % of the calcium salt of maleic acid, 11 weight % of N-vinyl caprolactam, 3 weight % of 4-hydroxybutyl vinyl ether and 0.1% of methylene bisacrylamide present in the well cement composition in an amount in the range of from about 0.1% to about 2% by weight of cement in the composition.

In order to further illustrate the compositions of this invention, the following examples are given:

EXAMPLE 1

A cement composition was prepared comprising Class H cement, deionized water in an amount of 5.08 gal. per sack of cement, silica flour in an amount of 35% by weight of cement and a modified lignosulfonate set retarder in an amount of 0.5% by weight of cement. To a first sample of the cement composition a prior art fluid loss control additive was added, and to a second sample of the cement composition a fluid loss control polymer additive of this invention was added. The resulting first and second samples of the cement composition were then tested for fluid loss at 230° F. in accordance with the API Specification For Materials and Testing For Well Cements. The results of these tests are given in Table I below.

TABLE I

| | Cement Composition Fluid Loss | | | | |
|---|---|---|---|---|---|
| Fluid Loss Control Additive | Water, gal/sk | Silica Flour, % by wt. of Cement | Set Retarder, % by wt. of Cement | Temp., ° F. | Fluid Loss, cc/min |
| Prior Art[1] | 5.08 | 35 | 0.5 | 230 | 56 |
| Present Invention | 5.08 | 35 | 0.5 | 230 | 44 |

[1]Copolymer of N,N-dimethylacrylamide and 2-acrylamido-2 methyl propane sulfonic acid. (See U.S. Pat. No. 4,444,269)

From Table I, it can be seen that the fluid loss control additive of this invention provided less fluid loss than the prior art fluid loss control additive.

EXAMPLE 2

The procedure set forth in Example 1 was repeated except that the cement composition comprised Class H cement, water in an amount of 4.8 gal. per sack of cement, crystalline silica in an amount of 35% by weight of cement and a set retarder comprising a copolymer of 2-acrylamido-2 methyl propane sulfonic acid and acrylic acid in an amount of 1% by weight of cement. To a first sample of the cement composition, a prior art fluid loss control additive was added, and to a second sample of the cement composition a fluid loss control polymer additive of this invention was added. The resulting first and second samples of the cement composition were then tested for fluid loss at 150° F. The results of these tests are given in Table I below.

TABLE II

| Fluid Loss Control Additive | Water, gal/sk | Crystalline Silica, % by wt. of Cement | Set Retarder, % by wt. of Cement | Temp., ° F. | Fluid Loss, cc/min |
|---|---|---|---|---|---|
| Prior Art[1] | 4.8 | 35 | 1 | 150 | 50 |
| Present Invention | 4.8 | 35 | 1 | 150 | 34 |

[1]Copolymer of N,N-dimethylacrylamide and 2-acrylamido-2 methyl propane sulfonic acid.

From Table II, it can again be seen that the fluid loss control additive of this invention provided less fluid loss than the prior art fluid loss control additive.

Thus, the present invention is well adapted to carry out the objects and attain the benefits and advantages mentioned as well as those which are inherent therein. While numerous changes can be made by those skilled in the art, such changes are encompassed within the spirit of this invention as defined by the appended claims.

What is claimed is:

1. A method of cementing a subterranean zone penetrated by a well bore comprising the steps of:
   (a) preparing or providing a cement composition comprising a hydraulic cement, sufficient water to form a pumpable slurry and a fluid loss control polymer additive comprising 77.9 weight % of the calcium salt of 2-acrylamido-2-methyl propane sulfonic acid, 8 weight % of the calcium salt of maleic acid, 11 weight % of N-vinyl caprolactam, 3 weight % of 4-hydroxybutyl vinyl ether and 0.1 weight % of methylene bisacrylamide;
   (b) placing said composition in said subterranean zone to be cemented; and
   (c) allowing said cement composition to set into an impermeable solid mass therein.

2. The method of claim 1 wherein said fluid loss control polymer additive is present in said cement composition in an amount in the range of from about 0.1% to about 2% by weight of cement therein.

3. The method of claim 1 wherein said hydraulic cement in said cement composition is selected from the group consisting of Portland cements, pozzolana cements, gypsum cements, aluminous cements and silica cements.

4. The method of claim 1 wherein said hydraulic cement is Portland cement.

5. The method of claim 1 wherein said water in said cement composition is selected from the group consisting of fresh water and salt water.

6. The method of claim 1 wherein said water is present in said composition in an amount in the range of from about 35% to about 100% by weight of cement therein.

7. A well cement composition comprising a hydraulic cement, sufficient water to form a pumpable slurry and a fluid loss control polymer additive that comprises 77.9 weight % of the calcium salt of 2-acrylamido-2-methyl propane sulfonic acid, 8 weight % of the calcium salt of maleic acid, 11 weight % of N-vinyl caprolactam, 3 weight % of 4-hydroxybutyl vinyl ether and 0.1 weight % of methylene bisacrylamide.

8. The composition of claim 7 wherein said fluid loss control polymer additive is present in said cement composition in an amount in the range of from about 0.1% to about 2% by weight of cement in said composition.

9. The composition of claim 7 wherein said hydraulic cement is selected from the group consisting of Portland cements, pozzolana cements, gypsum cements, aluminous cements and silica cements.

10. The composition of claim 7 wherein said hydraulic cement is Portland cement.

11. The composition of claim 7 wherein said water is selected from the group consisting of fresh water and salt water.

12. The composition of claim 7 wherein said water is present in an amount in the range of from about 35% to about 100% by weight of cement of said composition.

* * * * *